United States Patent Office 3,139,458
Patented June 30, 1964

3,139,458
SEMICARBAZONES OF NAPHTHALDEHYDES AND 5H BENZOCYCLOHEPTENE - 8 - CARBOXALDEHYDES
Leo A. Paquette, Portage Township, Kalamazoo County, Mich., assignor to The Upjohn Company, Kalamazoo, Mich., a corporation of Delaware
No Drawing. Filed Feb. 12, 1963, Ser. No. 257,877
5 Claims. (Cl. 260—554)

This invention relates to novel compositions of matter and to methods of preparing the same. It is particularly directed to novel semicarbazones of cyclic halovinyl aldehydes and to processes for the preparation of the same.

The novel compounds of the invention have the following formulas:

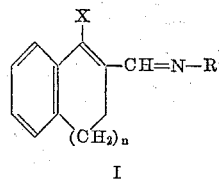 and 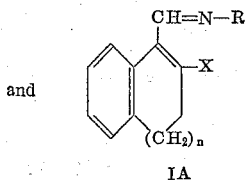

I                    IA wherein R is selected from the group consisting of ureido ($H_2N$—CO—NH—), 3-phenylureido, and 3,3-diphenylureido, X is selected from the group consisting of chlorine and bromine, and $n$ is an integer from 1 to 2.

The novel compounds of the invention are prepared by reacting a cyclic halovinyl aldehyde selected from the group consisting of compounds having the following formulas:

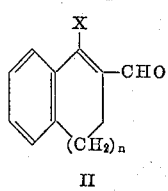 and 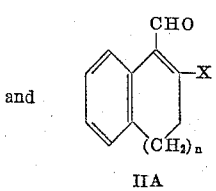

II                    IIA wherein X and $n$ are as given above, with a semicarbazide of the formula R—$NH_2$ wherein R is as given above.

Advantageously, the reaction between the cyclic halovinyl aldehyde of Formula II or IIA and the semicarbazide of the formula R—$NH_2$ wherein R is as given above.

Advantageously, the reaction between the cyclic halovinyl aldehyde of Formula II or IIA and the semicarbazide of formula R—$NH_2$ is carried out in the presence of an inert solvent, e.g., methanol, ethanol, propanol, and butanol, and mixtures of water and these lower alkanols. The semicarbazide can be incorporated into the reaction mixture per se or as an acid addition salt, e.g., as a hydrochloride or sulfate, in which case an alkaline material such as sodium or potassium acetate is added to the mixture in order to release the free base. Stoichiometrically the reaction requires equimolar amounts of the aldehyde and the semicarbazide, although an excess of either reactant can be employed if so desired. Preferably, the aldehyde and the semicarbazide are employed in molar ratios varying from about 1:1.5 to 1.5:1. The reaction can be carried out over a wide range of temperature, preferably between about 0° C. and about 125° C., and more particularly between about 20° C. and about 100° C. In many instances, it is very convenient to carry out the reaction at the reflux temperature of the inert solvent. The time required for completing the reaction will of course depend on the temperature at which the reaction is conducted and the reactivity of the particular reactants; generally speaking, reaction times varying from about 1 hour to about 6 hours suffice. Upon completion of the reaction, the desired semicarbazone of Formula I or IA can be isolated and purified by conventional procedures, e.g., filtration of the reaction mixture followed by recrystallization of the product thus obtained.

The cyclic halovinyl aldehydes of Formula II can be prepared by reacting 3,4-dihydro-1(2H)naphthalenone ($\alpha$-tetralone) or 6,7,8,9-tetrahydro-5H-cycloheptabenzen-5-one (benzsuberone) with a formylating agent consisting of dimethylformamide and a phosphorus halide such as phosphorus oxychloride or phosphorus oxybromide. See Ziegenbein et al., Chem. Ber. 93, 2743, 1960. The cyclic halovinyl aldehydes of Formula IIA can be prepared in the same manner, starting with 3,4-dihydro-2(1H)-naphthalenone ($\beta$-tetralone) or 5,7,8,9-tetrahydro-6H-cycloheptabenzen-6-one (Page et al., J. Am. Chem. Soc. 75, 2053, 1953).

The novel compounds of the invention have central nervous system depressant activity and can be used for effecting sedation in mammals, birds, and other animals. They also have antibacterial and antifungal activity, for example, against Staphylococcus aureus, Streptococcus lactis, Bacillus subtilis, Streptococcus faecalis, Staphylococcus albus, Serratia marcescens, Escherichia coli, Aerobacter aerogenes, Pseudomonas fluorescens, Pseudomonas aeruginosa, Klebsiella pneumoniae, Proteus vulgaris, Salmonella schottmuelleri, Salmonella gallinarum, Proteus morganii, Microsporum canis, Trichophyton rubrum, Alternaria solani and Sclerotinia fructicola, and can be used for decontamination of surfaces contaminated with such bacteria and fungi.

The invention may be more fully understood by reference to the following illustrative examples in which the parts and percentages are by weight unless otherwise specified.

Example 1.—1-Chloro-3,4-Dihydro-2-Naphthaldehyde Semicarbazone

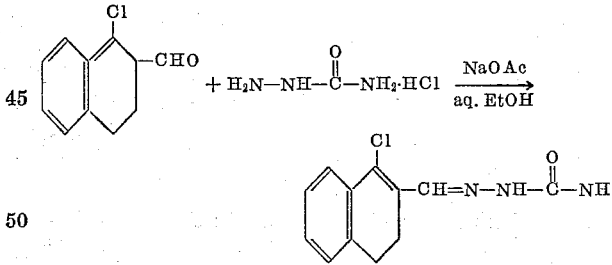

A mixture of 10.3 g. (0.050 mole) of 1-chloro-3,4-dihydro-2-naphthaldehyde, 6.2 g. (0.055 mole) of semicarbazide hydrochloride, 5.7 g. (0.70 mole) of anhydrous sodium acetate, 100 ml. of ethanol, and 25 ml. of water was heated under reflux for 2 hrs. After cooling, the precipitated solid was filtered, washed with ether, and dried. There was obtained 12.4 g. of pale yellow solid, M.P. 252–254° C. (dec.). Two recrystallizations of this material from dimethylformamide gave pure 1-chloro-3,4-dihydro-2-naphthaldehyde semicarbazone, M.P. 253–254° C.

Analysis.—Calcd. for $C_{12}H_{12}ClN_3O$: C, 57.72; H, 4.84; N, 16.83. Found: C, 57.63; H, 4.66; N, 16.52.

Example 2.—9-Chloro-6,7-Dihydro-5H-Benzocycloheptene-8-Carboxaldehyde Semicarbazone Following the procedure of Example 1, but substituting 1-chloro-3,4-dihydro-2-naphthaldehyde by 9-chloro-6,7-dihydro-5H - benzocycloheptene-8-carboxaldehyde, there was obtained 9-chloro-6,7-dihydro-5H-benzocycloheptene-8-carboxaldehyde semicarbazone.

*Example 3.—1-Chloro-3,4-Dihydro-2-Naphthaldehyde 4-Phenylsemicarbazone*

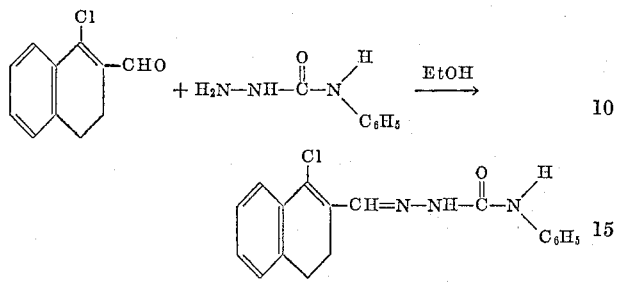

A solution of 5.2 g. (0.025 mole) of 1-chloro-3,4-dihydro-2-naphthaldehyde and 2.78 g. (0.025 mole) of 4-phenylsemicarbazide in 50 ml. of ethanol was refluxed for 2.5 hrs. After cooling, the precipitated solid was filtered and dried to give 5.3 g. of pale yellow solid, M.P. 231° C. Two recrystallizations of this material from dimethylformamide-water gave pure 1-chloro-3,4-dihydro-2-naphthaldehyde 4-phenylsemicarbazone as pale yellow needles, M.P. 233° C. (dec.).

*Analysis.*—Calcd. for $C_{18}H_{16}ClN_3O$: C, 66.36; H, 4.95; N, 12.90. Found: C, 66.04; H, 5.06; N, 12.79.

*Example 4.—9-Chloro-6,7-Dihydro-5H-Benzocycloheptene-8-Carboxaldehyde 4-Phenylsemicarbazone*

Following the procedure of Example 3, but substituting 1-chloro-3,4-dihydro-2-naphthaldehyde by 9-chloro-6,7-dihydro-5H-benzocycloheptene-8-carboxaldehyde, there was obtained 9-chloro-6,7-dihydro-5H-benzocycloheptene-8-carboxaldehyde 4-phenylsemicarbazone.

*Example 5.—1-Chloro-3,4-Dihydro-2-Naphthaldehyde-4,4-Diphenylsemicarbazone*

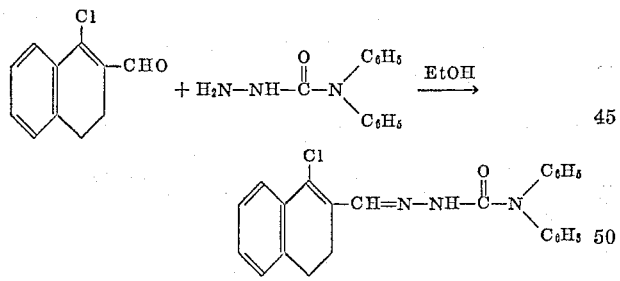

A solution of 5.2 g. (0.025 mole) of 1-chloro-3,4-dihydro-2-naphthaldehyde and 5.7 g. (0.025 mole) of 4,4-diphenylsemicarbazide in 50 ml. of ethanol was refluxed for 2.5 hrs. After cooling, the precipitated solid was filtered and dried to give 5.1 g. of pale yellow solid, M.P. 201–204° C. (dec.). Two recrystallizations of this material from ethanol gave pure 1-chloro-3,4-dihydro-2-naphthaldehyde 4,4-diphenylsemicarbazone as fluffy pale yellow needles, M.P. 204° C.

*Analysis.*—Calcd. for $C_{24}H_{20}ClN_3O$: C, 71.72; H, 5.02; N, 10.46. Found: C, 71.00; H, 5.28; N, 10.39.

*Example 6.—9-Chloro-6,7-Dihydro-5H-Benzocycloheptene-8-Carboxaldehyde 4,4-Diphenylsemicarbazone*

Following the procedure of Example 5, but substituting 1-chloro-3,4-dihydro-2-naphthaldehyde by 9-chloro-6,7-dihydro-5H-benzocycloheptene-8-carboxaldehyde, there was obtained 9-chloro-6,7-dihydro-5H-benzocycloheptene-8-carboxaldehyde 4,4-diphenylsemicarbazone.

By substituting 1-bromo-3,4-dihydro-2-naphthaldehyde and 9-bromo-6,7-dihydro-5H-benzocycloheptene-8-carboxaldehyde in the foregoing examples, the semicarbazones, 4-phenylsemicarbazones, and 4,4-diphenylsemicarbazones of 1-bromo-3,4-dihydro-2-naphthaldehyde and 9-bromo-6,7-dihydro-5H-benzocycloheptene-8-carboxaldehyde are obtained.

*Example 7.—2-Chloro-3,4-Dihydro-1-Naphthaldehyde 4-Phenylsemicarbazone*

A. 2-CHLORO-3,4-DIHYDRO-1-NAPHTHALDEHYDE

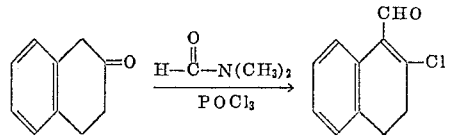

To a stirred solution of 30 g. of dimethylformamide in 100 ml. of trichloroethylene cooled in an ice bath was added 53 g. (0.346 mole) of phosphorus oxychloride below 10° C. When the addition was complete, the ice bath was removed and the mixture was stirred at room temperature for 0.5 hr. A solution of 50 g. (0.342 mole) of β-tetralone in 75 ml. of trichloroethylene was added below 60° C. with rapid stirring. The solution was stirred at 50–60° C. for 4 hrs., cooled, and to it was cautiously added a solution of 125 g. of sodium acetate in 375 ml. of water. The layers were separated and the aqueous layer was extracted with diethyl ether. The combined organic layers were dried, filtered, and evaporated. The residue was distilled to give 29.0 g. of colorless liquid which rapidly darkened (red), B.P. 150–155° C. (15 mm.). This material, 2-chloro-3,4-dihydro-1-naphthaldehyde, soon solidified to a white solid (pink supernatant on standing).

B. 2-CHLORO-3,4-DIHYDRO-1-NAPHTHALDEHYDE 4-PHENYLSEMICARBAZONE

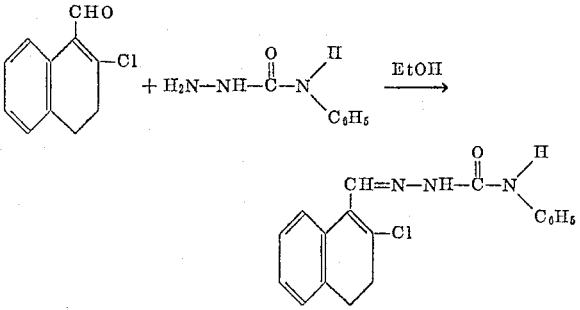

A solution of 7.0 g. (0.0368 mole) of the aldehyde of Part A and 5.6 g. (0.037 mole) of 4-phenylsemicarbazide in 50 ml. of ethanol was refluxed for 2 hrs. A solid mass formed almost immediately. After cooling, the solid was filtered, washed with ethanol, and dried. There was obtained 10.2 g. (85.5 percent) of white powder, M.P. 197–200° C. Recrystallization from dimethylformamide-water gave pure 2-chloro-3,4-dihydro-1-naphthaldehyde 4-phenylsemicarbazone as white needles, M.P. 203–204° C.

*Analysis.*—Calcd. for $C_{18}H_{16}ClN_3O$: C, 66.36; H, 4.95; N, 12.90. Found: C, 66.54; H, 5.23; N, 12.65.

*Example 8.—8-Chloro-6,7-Dihydro-5H-Benzocycloheptene-9-Carboxaldehyde 4-Phenylsemicarbazone*

Following the procedure of Example 7, substituting the β-tetralone by 5,7,8,9-tetrahydro-6H-cycloheptabenzen-6-one, there was obtained 8-chloro-6,7-dihydro-5H-benzocycloheptene-9-carboxaldehyde and its 4-phenylsemicarbazone.

By substituting the phosphorus oxychloride in Examples 7 and 8 by phosphorus oxybromide, the corresponding bromo compounds are obtained.

By substituting the 4-phenylsemicarbazide in Examples 7 and 8 by semicarbazide and 4,4-diphenylsemicarbazide, the corresponding semicarbazones of 2-chloro- and 2-bromo-3,4-dihydro-1-naphthaldehydes and 8-chloro- and 8-bromo-6,7-dihydro-5H-benzocycloheptene-9-carboxaldehydes are obtained.

I claim:
1. A compound selected from the group consisting of compounds having the following formula:

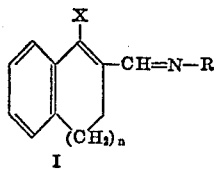

I and compounds having the following formula:

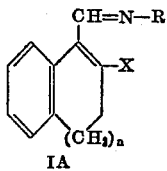

IA wherein X is selected from the group consisting of chlorine and bromine, $n$ is an integer from 1 to 2, and R is selected from the group consisting of ureido, 3-phenylureido, and 3,3-diphenylureido.

2. 1-chloro-3,4-dihydro - 2 - naphthaldehyde semicarbazone.

3. 1-chloro-3,4-dihydro - 2 - naphthaldehyde 4-phenyl-semicarbazone.

4. 1-chloro-3,4-dihydro-2-naphthaldehyde 4,4-diphenyl-semicarbazone.

5. 2-chloro-3,4-dihydro - 1 - naphthaldehyde 4-phenyl-semicarbazone.

References Cited in the file of this patent

Fieser: Organic Chemistry, Third Edition, 1956, page 212.